G. S. BINCKLEY.
FLUID METER.
APPLICATION FILED JUNE 14, 1917.

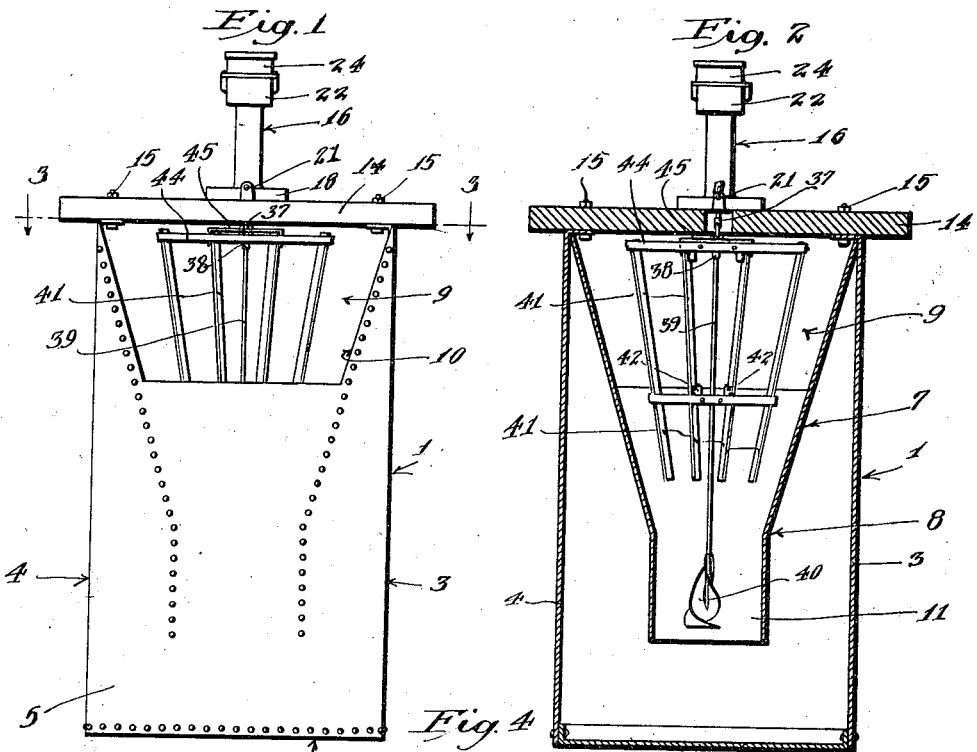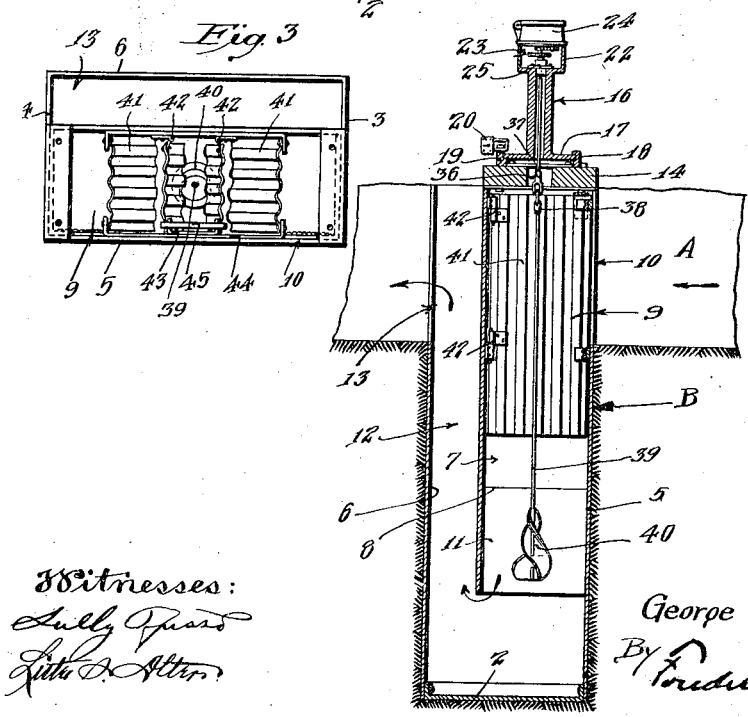

1,279,232.

Patented Sept. 17, 1918.
2 SHEETS—SHEET 2.

Inventor
George Sydney Binckley.
By Frederick B. Lyon
Attys

UNITED STATES PATENT OFFICE.

GEORGE SYDNEY BINCKLEY, OF LOS ANGELES, CALIFORNIA, ASSIGNOR TO HYDROMETRIC COMPANY, OF LOS ANGELES, CALIFORNIA, A CORPORATION OF CALIFORNIA.

FLUID-METER.

1,279,232.

Specification of Letters Patent. Patented Sept. 17, 1918.

Application filed June 14, 1917. Serial No. 174,674.

*To all whom it may concern:*

Be it known that I, GEORGE SYDNEY BINCKLEY, a citizen of the United States, residing at Los Angeles, in the county of Los Angeles and State of California, have invented a new and useful Fluid-Meter, of which the following is a specification.

This invention relates to improvements in fluid meters of the type embodied in my pending application for fluid meter, filed September 8, 1915, Serial No. 49420, which measure and register the volume of fluid passing a given point in a channel, trough or like means, through which fluid flows.

One of the objects of the invention is to provide a device of the above named character which is simple in construction, may be cheaply manufactured and is primarily adapted for use in connection with irrigation ditches for the measurement of water passing through the ditches in order that the land owner or the user of the water may determine the amount of water used.

Another object of the invention is to provide a fluid meter of the character described in which the means that is operated by the fluid flowing through the device is constructed so that it will have a free movement and give when foreign matter in the fluid comes into contact therewith and for this reason will prevent clogging of the meter.

A further object is to generally improve and simplify the construction and operation of meters of the character described so that they may be easily and quickly installed, and will operate in a reliable manner at all times and require little or no attention after installation.

A still further object is to provide a meter of the character described which is constructed so that it cannot be tampered with by an unauthorized person and will therefore provide just and accurate readings.

The accompanying drawings illustrate the invention:

Figure 1 is a front elevation of the device.

Fig. 2 is a vertical sectional view.

Fig. 3 is a horizontal sectional view taken on line 3—3 of Fig. 1.

Fig. 4 is a vertical sectional view taken at right angles to the sectional view in Fig. 2.

Figure 5:
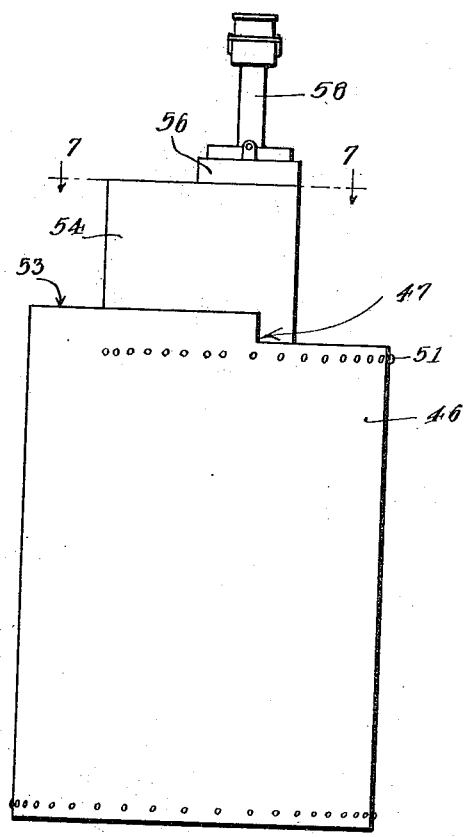
Fig. 5 is a side elevation of a modified form of meter.

In the drawings, 1 designates a preferably substantially rectangular casing comprising a bottom wall 2, end walls 3 and 4 and side walls 5 and 6.

Mounted within the casing 1 is a vertically disposed acceleration chamber 7, certain opposed walls of which are inclined inwardly and downwardly to a point 8 and the upper larger end of the acceleration chamber is provided with a horizontal inlet opening 9, the walls of the casing being cut away to provide for the inlet 9. The chamber 7 terminates at its lower end in a throat 11 extending from the point 8 which is the terminus of the converging side walls or the taper of the chamber, to a point spaced from the bottom wall 2 of the casing. The rear face of the chamber 7 is spaced from the wall 6 of the casing 1 and is substantially parallel thereto so as to provide a vertical outlet passage 12 which communicates with a cut-out portion or discharge opening 13 in the upper end of the wall 6.

As shown in Fig. 4, an irrigation ditch A is dug out or deepened as at B to receive the casing 1 and said casing is positioned with the opening 10 in the wall 5 adapted to receive the water flowing in the direction of the arrow in the ditch. Water upon entering the horizontal inlet 9 will flow downwardly through the acceleration chamber 7 and at the point 8 will be accelerated and then discharged through the extended portion 11 into the lower end of the casing. From the lower end of the casing the water will flow upwardly in the passage 12 and escape through the opening 13 in the wall 6 into the ditch A.

A meter supporting plate 14 is secured by fastening means 15 to the upper end of the casing 1. Mounted upon the plate 14 is a tubular standard or casing member 16 having a flange 17 on its lower end. One edge of the flanges 17 is engaged in a notched keeper 18 on the plate 14 and the other edge of the flange rests upon a similar keeper member 19. A padlock or other suitable means 20 is provided to hold the flange 17 in place, said padlock being inserted through an opening 21 formed in the member 19 and being disposed in such position as to prevent the removal of the member 16 and flange 17 thereof. The upper end of the member 16 is formed in the nature of a casing 22 which carries suitable mechanism 23 for operating the meter 24, said meter being supported by the casing 22. A bearing supporting member or housing 25 is mounted within the casing 22, there being provided apertured flanges 26 on the housing 25 which are bolted or otherwise secured to the casing 22. The lower portion of the housing 25 is extended into the standard 16.

Extending upwardly through the standard 16 and housing 25 is a shaft 27 carrying a circular disk 28 on its upper end and a pin 29 is carried upon the disk 28 and serves to coöperate with the means 23 for operating the meter 24. The disk 28 rests within a recess 30 formed in the upper end of a cylindrical bearing member 31, through which the shaft passes. The lower end of the bearing member 31 is beveled as at 32 upon its outer face and said face rests upon balls 33, the latter being mounted within a cup or retaining member 34 which is secured to the bottom wall of the housing 25. A tubular member 35 is carried by the housing 25 on the bottom wall thereof and projects upwardly through the cup 34 and into the bearing 31. This tubular member surrounds the shaft 27 in circumferentially spaced relation thereto. The shaft 27 is also spaced from contact with the housing 25 and standard 16. The plate 14 is provided with an opening 36 therein through which the shaft 27 extends.

Mounted upon the lower end of the shaft 27 is a hook member 37 with which is adapted to be connected an eye 38 carried upon the upper end of a propeller shaft 39. The shaft extends downwardly through the chamber 7 and terminates at a point within the throat 11 thereof. At its lower end the shaft 39 supports a propeller wheel 40 of any suitable construction, the propeller wheel being mounted within the throat portion 11 of the chamber 7. The shaft 39, it will be seen, has a universal connection with the shaft 27 and is permitted a great deal of lateral and other play. The one bearing for the shaft 27 permits an appreciable play. This freedom of movement of the shafts 39 and 27 is desirable in order that the device may operate with accuracy and without being deranged when the wheel 40 or shaft 39 is engaged and moved by a stick, tree branch or other object in the water which flows through the chamber 7. It will therefore be seen that the one bearing at the upper end of the shaft 27 and the universal connection provided by the hook and eye are essential features of the invention.

In order to prevent the fluid passing through the chamber 7 from swirling, such swirling often causing inaccuracies in the operation of the meter, there are provided downwardly converging baffle plates 41 extending transversely of the chamber 7. These plates are preferably corrugated so as to increase their effectiveness as baffles. By having the plates converged the fluid passing therebetween is accelerated. The shaft 39 extends downwardly between the innermost opposed plates and such plates, it will be seen, are hinged as at 42 at their innermost edges to the rear side of the chamber 7. The opposite edges of the innermost baffle plates are free from connection with the chamber 7 or casing 1 and are held against movement by a spacing member 43. The spacing member 43 is secured to a supporting bar 44 to which the outer edges of the other baffle plates are attached and the ends of said member 43 abut against the opposed faces of said innermost plates. A removable substantially U-shaped retaining member 45 is placed over the innermost baffle plates and holds them in position and in engagement with the spacing member 43. In order to remove the shaft 39 with the wheel 40 thereon, the member 45 is lifted upwardly so as to allow the plates held thereby to be swung apart on the hinges 42 sufficiently far to permit the shaft 39 and wheel 40 thereon to be lifted upwardly and out of the chamber 7.

In operation, assuming that the device has been installed in an irrigation ditch as shown in Fig. 4 of the drawings, water will enter the acceleration chamber 7 through the inlet opening 9 and upon encountering the baffle plates 41 will be directed downwardly and therefore prevented from swirling. The contraction of the chamber 7 toward its lower end provides for an acceleration of the flow of the fluid and as the fluid discharges through the throat 11 the propeller 40 is rotated, causing the shafts 39 and 27 to be correspondingly rotated and the mechanism 23 which is operatively associated with the shaft 27 to operate the register 24. Water escaping from the throat 11 passes up through the passage 12 and out through the opening 13 back into the irrigation ditch. It will be seen that should an object in the water strike the shaft 39 or wheel 40, both shaft and wheel will be permitted to give and for this reason all possibility of the device being rendered inoperative by reason of its being clogged with refuse is eliminated. The universal connection between the shafts 39 and 27 and the one bearing provided at the upper end of the shaft 27 reduce friction to such an extent that the device will operate with great accuracy at all times. Tampering with the meter by unauthorized persons is prevented by the lock 20 and associated means for holding the meter mechanism securely in place and in such position that it is inaccessible to persons not possessing a key to the lock. The shaft 39 and propeller 40 may be easily removed by moving the innermost baffle plates 41 apart as hereinbefore described.

Figure 6:
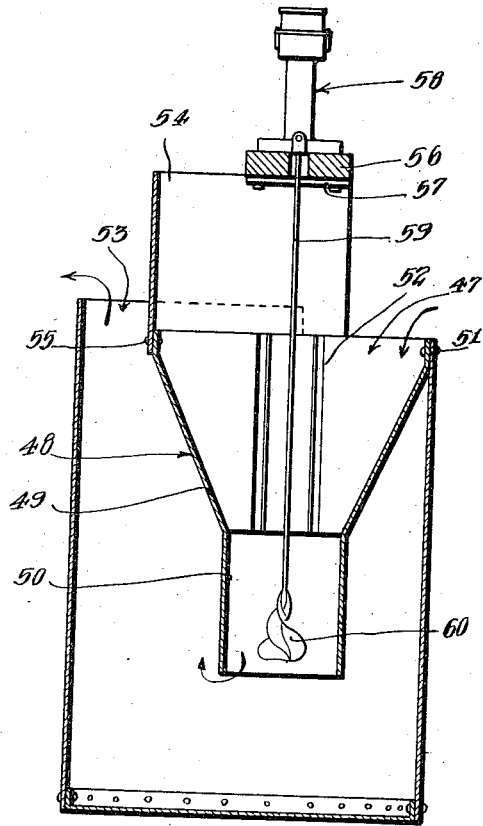
Fig. 6 is a vertical sectional view of said form.
Figure 7:
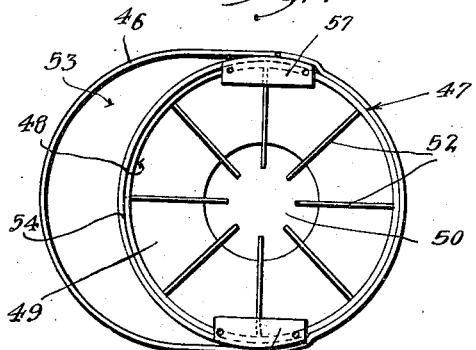
Fig. 7 is a horizontal sectional view taken on line 7—7 of Fig. 5.
Figure 8:
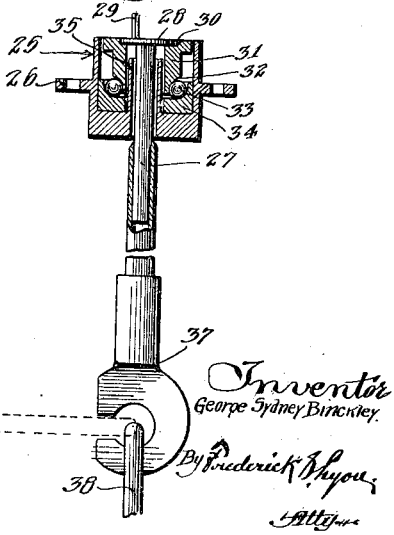
Fig. 8 is an enlarged detailed sectional view partly in elevation of the means for operating the register.

Referring to Figs. 5, 6 and 7 wherein there is illustrated a modified form of the invention, 46 designates a casing which is substantially cylindrical in form instead of being rectangular as is the casing in the preferred form of the invention. This casing is open at its upper end and upon one side is cut away as at 47 so as to permit an inflow of fluid at the cut-away portion. Secured to and within the casing with its upper end in line with the cut-away portion of the casing is a funnel shaped acceleration chamber 48 comprising a frusto-conical body portion 49 and discharge throat 50. This chamber 48 is bolted or otherwise secured at 51 to the casing 46 and at its lower end is spaced from the casing. Baffle plates 52 are secured to the inner face of the wall of the body portion 49 of the chamber and extend inwardly or radiate from said wall and are spaced from one another at their inner edges. These baffle plates 52 prevent swirling of the fluid entering the chamber 48 and direct the fluid downwardly through the throat 50.

Fluid discharged through the throat 50 into the casing 46 will pass upwardly between the rear face of the chamber and casing and out through the discharge opening 53 at the upper end of the casing. A semi-annular upwardly extending plate 54 is bolted or otherwise secured as at 55 to the upper end of the chamber 48. This plate extends half way around the upper end of the body portion of the chamber and considerably above the upper end of the casing 46. A supporting plate 56 is mounted upon the upper end of the plate 54 upon brackets 57 and extends across said plate 54. Supported upon the plate 56 is a register mechanism 58 which is identical with the register mechanism in the preferred form of the invention and need not be described in detail. A shaft 59 is universally connected with the mechanism 58 in the same manner as is the corresponding shaft in the preferred form of the invention and extends downwardly between the baffle plates 52 into the throat 50 at which point on the shaft is secured a propeller 60 of any suitable form and which will cause the shaft to be rotated when the fluid discharges through the throat. This form of the invention is identical with the preferred form as to its mode of operation and differs from the preferred form only in respect to its shape which is substantially cylindrical instead of rectangular. The operation of this form of the invention need not be described since it is precisely the same as the operation of the preferred form.

I claim:

1. A fluid meter comprising an acceleration chamber having an inlet at its upper end and being contracted at its lower end to form a throat, a registering device, means to support the registering device, a vertical shaft having a universal connection with the registering device and projecting through the chamber into the throat thereof, and a fluid operated wheel in said throat and fixed to the shaft.

2. A fluid meter comprising a casing, an acceleration chamber having an inlet at its upper end and a contracted outlet throat at its lower end mounted within the casing, said throat adapted to discharge into the casing, a registering device located above the chamber, means to support the registering device, a shaft having a universal connection with the registering device and extending into the chamber, the lower end of the shaft terminating within the throat of the chamber, and a fluid operated wheel on the lower end of the shaft.

3. A fluid meter comprising a chamber through which fluid passes, a registering device, means to support the registering device, a vertical shaft operatively connected with the registering device and having a single bearing at its upper end, another vertical shaft universally connected with the first named shaft and extending into the chamber, and a fluid operated wheel carried by the last named shaft.

4. A fluid meter comprising a chamber through which fluid passes, a registering device, means to support the registering device, a vertical shaft operatively connected with the registering device, and having a single bearing at its upper end, another vertical shaft universally connected with the first named shaft and extending into the chamber, and a fluid operated wheel carried by the last named shaft, said chamber being contracted at its discharge end.

5. A fluid meter comprising an acceleration chamber having an inlet at its upper end and being contracted at its lower end, a regstering device, means to support the registering device, a rotary shaft having a registering device, only at its upper end and free to bearing only at its upper end and connected at its swing at its lower end and connected at its upper end with the registering device, and a fluid operated wheel in the contracted lower end of said chamber and connected to the shaft.

6. A fluid meter comprising an acceleration chamber having an inlet at its upper end and being contracted at its lower end, a registering device, means to support the registering device, a rotary shaft having a bearing only at its upper end and connected at its upper end with the registering device, and a fluid operated wheel connected to the shaft for relative universal movement.

7. In a fluid meter, a downwardly reduced chamber through which fluid passes, baffle plates within and surrounding the vertical axis of the chamber to prevent swirling of the fluid, said baffle plates being reduced in width downwardly and being radially arranged, a registering device, a vertical rotary shaft mounted within the chamber and connected with the registering device, and a fluid operated wheel carried by the shaft, said wheel being directly beneath the lower ends of the baffle plates.

8. A fluid meter comprising a casing having an inlet opening on one side and an outlet opening on the other side, a chamber through which fluid passes mounted within the casing and having its upper end disposed to receive fluid from the inlet opening and its lower end adapted to discharge fluid into the casing, a registering device, a shaft for operating the registering device and having a bearing at its upper end only, said shaft being operatively connected with the registering device and free to swing at its lower end, and a fluid operated wheel mounted within the chamber and connected to the shaft.

9. A fluid meter comprising a casing having an inlet opening on one side and an outlet opening on the other side, a chamber through which fluid passes mounted within the casing and having its upper end disposed to receive fluid from the inlet opening and its lower end adapted to discharge fluid into the casing, a registering device, a shaft for operating the registering device and having a bearing at its upper end only, said shaft being operatively connected with the registering device, and a fluid operated wheel mounted within the chamber and universally connected to the shaft.

10. A fluid meter comprising a casing, a chamber through which fluid passes mounted within the casing, a supporting plate secured upon the upper end of the casing, a registering device mounted upon the supporting plate and adapted to be removed therefrom, means to lock the registering device upon the plate, a vertical rotary shaft connected for universal movement to the registering device and adapted to be removed therefrom, and a fluid operated wheel mounted within the chamber and connected with the shaft.

11. A fluid meter comprising a chamber through which fluid passes, said chamber having a contracted discharge throat, a plurality of baffle plates mounted within the chamber above the throat adapted to prevent swirling of fluid passing through the chamber, a registering device, means to support the registering device above the baffle plates, a vertical rotary shaft connected to the registering device and extending between certain opposed baffle plates, the baffle plates between which the shaft extends being movable away from each other, and a fluid operated wheel mounted within the throat and connected with the shaft.

12. A fluid meter comprising a chamber having an inlet and an outlet, a registering device, means to support the registering device, a vertical shaft operatively connected with the registering device and having a bearing at its upper end only and extending into the chamber, said shaft having free lateral play excepting at the bearing, and a fluid operated wheel in the chamber fixed to the shaft.

Signed at Los Angeles, California, this 18th day of April 1917.

GEORGE SYDNEY BINCKLEY.